(12) United States Patent
Hung

(10) Patent No.: US 7,575,469 B1
(45) Date of Patent: Aug. 18, 2009

(54) BATTERY CONNECTOR

(75) Inventor: Pe-Chiao Hung, Taipei Hsien (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 12/205,576

(22) Filed: Sep. 5, 2008

(51) Int. Cl.
*H01R 3/00* (2006.01)
(52) U.S. Cl. .................................... 439/500; 439/862
(58) Field of Classification Search ................ 439/862, 439/500
See application file for complete search history.

(56) References Cited

U.S. PATENT DOCUMENTS

| | | | | |
|---|---|---|---|---|
| 6,068,519 A * | 5/2000 | Lok | ........................... | 439/660 |
| 6,077,130 A * | 6/2000 | Hughes et al. | ............... | 439/862 |
| 6,302,727 B1 * | 10/2001 | Fedorjaka | .................... | 439/500 |
| 6,361,359 B1 * | 3/2002 | Du et al. | ...................... | 439/500 |
| 6,540,567 B1 * | 4/2003 | Yeh | ............................ | 439/736 |
| 6,554,640 B1 * | 4/2003 | Koike et al. | .................. | 439/500 |
| 6,695,628 B2 * | 2/2004 | Yeh | ............................ | 439/83 |
| 6,702,621 B2 * | 3/2004 | Yeh | ............................ | 439/660 |
| 6,869,299 B2 * | 3/2005 | Tanaka et al. | ............... | 439/188 |
| 6,875,049 B2 * | 4/2005 | Kyowski et al. | ............ | 439/500 |
| 6,951,488 B2 * | 10/2005 | Hsieh | ......................... | 439/660 |
| 6,994,576 B2 * | 2/2006 | Tanaka et al. | ............... | 439/188 |
| 7,029,287 B2 * | 4/2006 | Matsunaga et al. | ............ | 439/65 |
| 7,122,274 B2 * | 10/2006 | Oe et al. | ...................... | 429/123 |
| 7,258,571 B1 * | 8/2007 | Chen | .......................... | 439/500 |
| 7,278,892 B1 * | 10/2007 | Chien et al. | .................. | 439/862 |
| 7,357,665 B1 * | 4/2008 | Yan | ............................ | 439/500 |
| 7,387,541 B1 * | 6/2008 | Lai et al. | ..................... | 439/660 |
| 7,390,229 B2 * | 6/2008 | Huang et al. | ................. | 439/862 |
| 7,517,261 B2 * | 4/2009 | Wan et al. | .................... | 439/862 |
| 2002/0048999 A1 * | 4/2002 | Ming-Hui | ................... | 439/660 |
| 2003/0216067 A1 * | 11/2003 | Yeh | ............................ | 439/83 |
| 2003/0216070 A1 * | 11/2003 | Yeh | ............................ | 439/131 |
| 2003/0216073 A1 * | 11/2003 | Yeh | ............................ | 439/188 |
| 2004/0121654 A1 * | 6/2004 | Chao et al. | .................. | 439/660 |
| 2004/0161979 A1 * | 8/2004 | Kyowski et al. | ........... | 439/660 |
| 2005/0054242 A1 * | 3/2005 | Hsieh | ......................... | 439/660 |
| 2007/0232102 A1 * | 10/2007 | Huang et al. | ................. | 439/166 |
| 2008/0153347 A1 * | 6/2008 | Lai et al. | ..................... | 439/500 |
| 2009/0023331 A1 * | 1/2009 | Chien et al. | .................. | 439/500 |

* cited by examiner

*Primary Examiner*—Ross N Gushi
(74) *Attorney, Agent, or Firm*—WPAT, P.C.; Anthony King

(57) ABSTRACT

A battery connector includes a housing having terminal chambers to receive plural terminals therein. The terminals have elastic portions received in the terminal chambers and contact portions extending from the elastic portions and projecting out of the terminal chambers for electrically contacting a battery. The housing defines a positioning recess across fronts of the terminal chambers. The positioning recess has a block located therein. At least one fixing element is fixed into corresponding insertion cavity defined between the terminal chambers and adjacent to the positioning recess and press against in front of the block for fixing the block in the positioning recess firmly. The block can prevent the elastic portions of the terminals from contacting a PCB which is soldered in front of the housing when the elastic portions are compressed.

5 Claims, 2 Drawing Sheets

BATTERY CONNECTOR

BACKGROUND OF THE INVENTION

1. Field of the Invention

The present invention relates to an electrical connector, and more particularly to a battery connector.

2. The Related Art

In the mobile communication field, a battery connector is assembled in a mobile phone for electrically connecting a battery with a printed circuit board (PCB). A traditional battery connector includes a dielectric housing defining terminal grooves therein and electric terminals received in the corresponding terminal grooves. Each of the electric terminals has a base portion, a soldering portion extending from one end of the base portion for being soldered to the PCB, an elastic portion extending from the other end of the base portion and a contact portion extending from the elastic portion. The contact portion partly upwardly project out of the terminal groove for contacting a battery. The battery is arranged in the mobile phone to contact the contact portions of the electric terminals for electrically connecting with the PCB.

However, when the battery press the contact portions, the elastic portions are also compressed, the elastic portions would likely contact the PCB which is soldered with the soldering portions of the electric terminals to cause a short-circuit between the electric terminals and the PCB, which has a bad effect to the battery connector.

SUMMARY OF THE INVENTION

An object of the present invention is to provide a battery connector capable of avoiding a short-circuit between a PCB and terminals. The battery connector includes a housing having a bottom wall, a rear wall protruding upward from the bottom wall and two opposite sidewalls connecting the rear wall with bottom wall, all of which defines a space therebetween. At least one partition wall is located between the two sidewalls to separate the space into terminal chambers. A positioning recess is defined in the housing and across fronts of the terminal chambers. At least one of the sidewalls and the partition walls defines an insertion cavity adjacent to the positioning recess. A plurality of terminals is received in the terminal chambers of the housing. Each of the terminals has a base portion, an elastic portion extending and bending upward back and forth from the base portion, a contact portion extending from the elastic portion and projecting out of the terminal chamber from a top of the housing opposite the bottom wall for elastically contacting a battery. A block is positioned in the positioning recess for preventing the terminals from contacting a printed circuit board located in front of the housing. At least one fixing element includes a fixing portion fixed into the insertion cavity and a propping portion against a front of the block back to the rear wall in order to fix the block in the positioning recess.

As described above, by disposing the block in the positioning recess of the housing, the block can effectively prevent the elastic portions of the terminals from contacting the PCB when the elastic portions are compressed by the battery. Thus, a short-circuit between the elastic portions and the PCB can be avoided. Moreover, the fixing portion of the fixing element is fixed into the insertion cavity, and the propping portion presses against the block, which provides a resistance to the block while the terminals are compressed to act on the block. So that the block can be located in the positioning recess firmly. Therefore, the battery connector can work stably.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
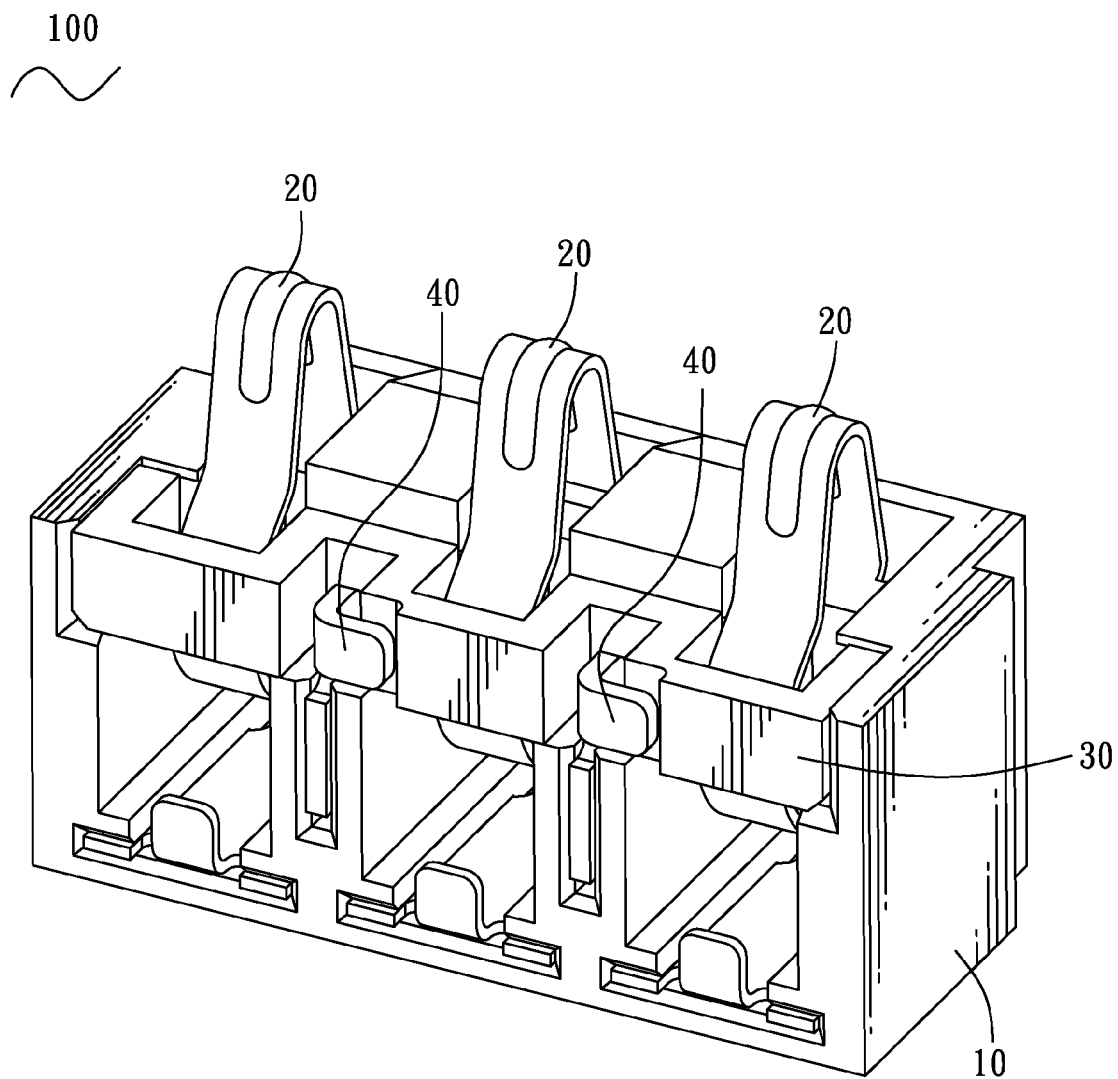
FIG. 1 is a perspective view of an electrical connector in accordance with the present invention.
Figure 2:
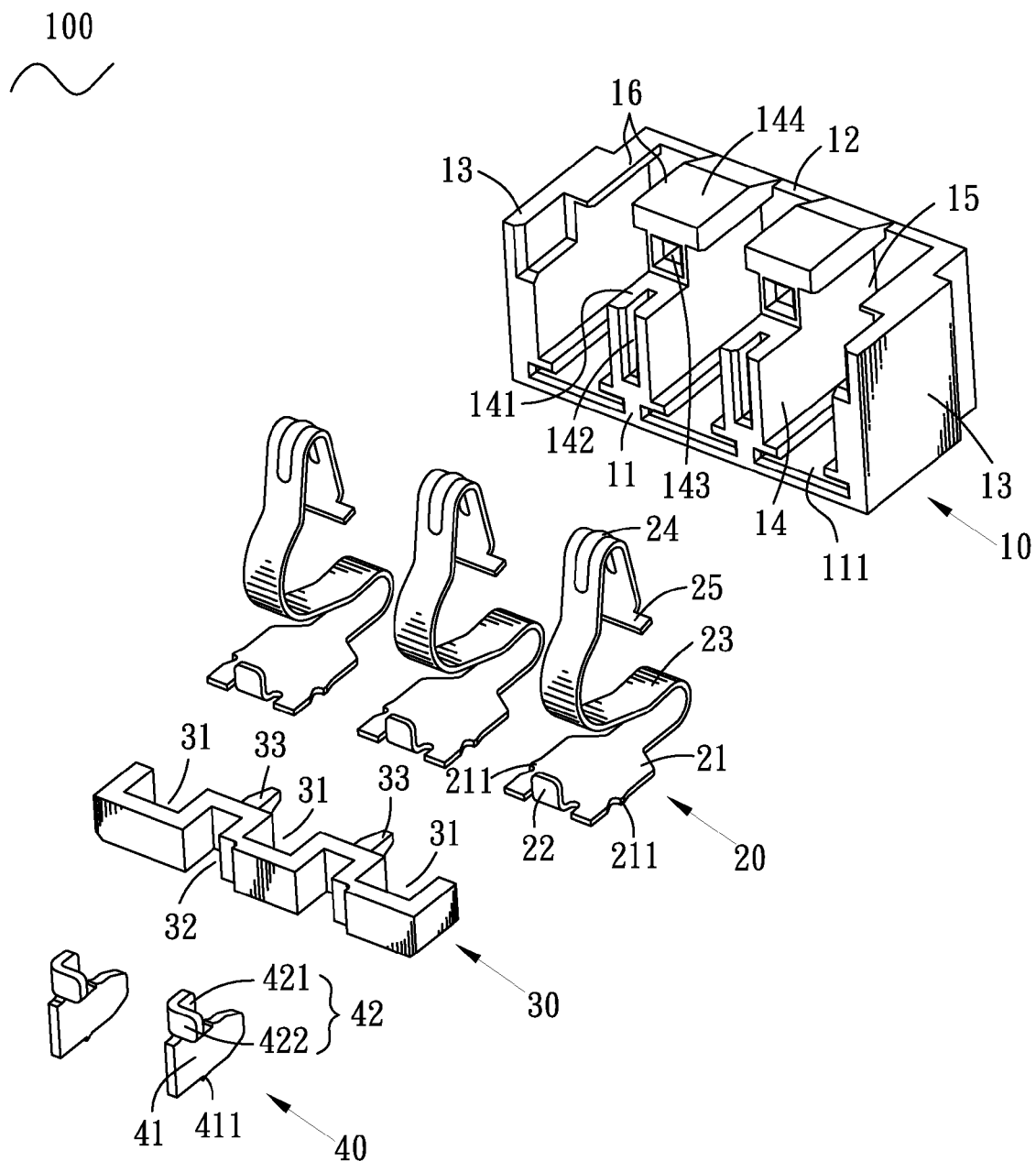
FIG. 2 is an exploded view of the electrical connector.

With reference to FIG. 1 and FIG. 2, a battery connector 100 according to the invention includes a housing 10, several terminals 20, a block 30 and a pair of fixing elements 40.

The housing 10 has a bottom wall 11, a rear wall 12 protruding upward from the bottom wall 11 and two opposite sidewalls 13 connected with the bottom wall 11 and the rear wall 12, all of which corporately define a space therebetween. Two partition walls 14 extend upward from the bottom wall 11 and locate between the two sidewalls 13 to separate the space into three terminal chambers 15 for receiving the terminals 20. The bottom wall 11 respectively defines three fixing troughs 111 connected with the corresponding terminal chambers 15. The housing 10 defines a positioning recess 141 for locating the block 30 at an upper portion thereof and across fronts of the terminal chambers 15. The positioning recess 141 further extends sideward into the sidewalls 13. A bottom side of the positioning recess 141 defines two insertion cavities 142 extending downward therefrom and respectively penetrating through a front surface of each partition wall 14. A lateral side which is perpendicular to the bottom side of the positioning recess 141 defines two fixing holes 143 at the partition walls 14 and extending towards the rear wall 12 respectively.

Each of rear parts of the partition walls 14 defines a stopper 144 above the fixing hole 143. Tops of the stoppers 144 are higher than tops of the sidewalls 13. Both of two opposite sides of the stoppers 144 and rear parts of the sidewalls 13 extend towards the terminal chambers 15 to form withstanding beams 16. Front ends of the withstanding beams 16 are disposed in the same plane with the lateral side of the positioning recess 141. Rear ends of the withstanding beams 16 connect with the rear wall 12.

The terminal 20 has a base portion 21, and a soldering portion 22 bending upward from a middle portion of a front end of the base portion 21 for being soldered to a PCB (not shown). The base portion 21 defines two projecting thorns 211 at two opposite sides thereof. A rear end of the base portion 21 extends and bends upward back and forth to form an elastic portion 23. A free end of the elastic portion 23 extends upward and then bends downward to form a contact portion 24. A wing portion 25 wider than the contact portion 24 extends from a free end of the contact portion 24 and leans towards the elastic portion 23.

The block 30 defines receiving cavities 31 separated from each other at a rear surface thereof and retaining cavities 32 disposed between the receiving cavities 31 at a front surface thereof. The receiving cavities 31 and the retaining cavities 32 are interlaced. A front end of one side of the retaining cavities 32 further extends sideward to form the retaining cavities 32 substantially L-shaped. Two fixing pegs 33 extend rearward from the rear surface of the block 30 at opposite places of the retaining cavities 32.

The fixing element 40 has a fixing portion 41 and a substantially L-shaped propping portion 42 including a first slice 421 extending upward from a top of the fixed portion 41 and a second slice 422 perpendicularly connected to the first slice 421. The fixing portion 41 defines two projecting agnail 411 respectively positioned at a top and a bottom thereof.

In assembly, the terminals 20 are received in the terminal chambers 15 of the housing 10. The base portions 21 of the terminals 20 are received in the fixing troughs 111 while the projecting thorns 211 of the base portions 21 are tightly against two sides of the fixing troughs 111 to fix the terminals 20 in the terminal chambers 15 firmly. The contact portions 24 project out of the terminal chambers 15 for contacting a battery (not shown).

The block 30 is located at the positioning recess 141 of the housing 10 with the fixing pegs 33 inserted into the corresponding fixing holes 143. In this case, the retaining cavities 32 communicate with the insertion cavities 142, the elastic portions 23 of the terminals 20 partly extend into the receiving cavities 31.

The fixing elements 40 are assembled to the housing 10 with the fixing portions 41 inserted into the insertion cavities 142. The projecting agnail 411 of the fixing portions 41 are tightly against tops and bottoms of the insertion cavities 142. The propping portions 42 protrude out of the insertion cavities 142 and are received in the retaining cavities 32 of the block 30 for resisting the block 30.

When the battery connector 100 is used in an electronic device, the battery is installed in the electronic device and electrically contacts with the terminals 20 of the electrical connector 100 to provide power for the electronic device. The battery presses the contact portions 24 of the terminals 20 downward and the elastic portions 23 are compressed to push the block 30 forward. Then the block 30 acts on the fixing elements 40. But the propping portions 42 of the fixing elements 40 can resist the block 30 and keep it in the positioning recess 141 of the housing 10. Because of the block 30, the elastic portions 23 do not contact the PCB which is soldered with the soldering portions 22 of the terminals 20 and located in front of the housing 10. When the battery is fetched out of the electronic device, the elastic portions 23 restore their resilience to push the contact portions 24 to project out of the terminal chambers 15, the withstanding beams 16 resist two ends of the wing portions 25 to limit the resilience of the elastic portions 23.

As the above description, by disposing the block 30 in the positioning recess 141 of the housing 10, the block 30 can effectively prevent the elastic portions 23 of the terminals 20 from contacting the PCB when the elastic portions 23 are compressed by the battery. Thus, a short-circuit between the elastic portions 23 and the PCB can be avoided. Moreover, the fixing portions 41 of the fixing elements 40 are fixed in the insertion cavities 142. The propping portions 42 press against the block 30, which provides a resistance to the block 30 while the terminals 20 are compressed to act on the block 30. So that the block 30 can be located in the positioning recess 141 firmly. Thus, the battery connector 100 can work stably.

What is claimed is:

1. A battery connector, comprising:
    a housing having a bottom wall, a rear wall protruding upward from the bottom wall and two opposite sidewalls connecting the rear wall with bottom wall, all of which defines a space therebetween, at least one partition wall being located between the two sidewalls to separate the space into terminal chambers, a positioning recess being defined in the housing and across fronts of the terminal chambers, at least one of the sidewalls and the partition walls defining a insertion cavity adjacent to the positioning recess;
    terminals received in the terminal chambers of the housing, each of the terminals having a base portion, an elastic portion extending and bending upward back and forth from the base portion, a contact portion extending from the elastic portion and projecting out of the terminal chamber from a top of the housing opposite the bottom wall for elastically contacting a battery;
    a block positioned in the positioning recess for preventing the terminals from contacting a printed circuit board located in front of the housing; and
    at least one fixing element including a fixing portion fixed into the insertion cavity and a propping portion against a front of the block back to the rear wall in order to fix the block in the positioning recess.

2. The battery connector as claimed in claim 1, wherein the front of the block defines at least one retaining cavity for retaining the propping portion therein.

3. The battery connector as claimed in claim 2, wherein the retaining cavity is substantially L-shaped, the propping portion is substantially L-shaped and includes a first slice and second slice both against the block.

4. The battery connector as claimed in claim 1, wherein a portion of a rear of the block protrudes rearward to form at least one fixing peg for being correspondingly inserted into at least one fixing hole defined in one of the sidewalls and the partition walls and adjacent to a rear of the positioning recess.

5. The battery connector as claimed in claim 1, wherein the rear of the block defines receiving cavities corresponding to the terminal chambers for receiving parts of the terminals therein.

* * * * *